United States Patent
Kaluzhny et al.

(10) Patent No.: US 10,951,403 B2
(45) Date of Patent: Mar. 16, 2021

(54) UPDATING CRYPTOGRAPHIC KEYS STORED IN NON-VOLATILE MEMORY

(71) Applicant: Winbond Electronics Corporation, Taichung (TW)

(72) Inventors: Uri Kaluzhny, Beit Shemesh (IL); Mark Luko, Herzliya (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 245 days.

(21) Appl. No.: 16/207,207

(22) Filed: Dec. 3, 2018

(65) Prior Publication Data
US 2020/0177379 A1    Jun. 4, 2020

(51) Int. Cl.
*H04L 9/08* (2006.01)

(52) U.S. Cl.
CPC .......... *H04L 9/0869* (2013.01); *H04L 9/0891* (2013.01); *H04L 9/0897* (2013.01)

(58) Field of Classification Search
CPC .... H04L 9/0869; H04L 9/0891; H04L 9/0816
USPC ......................................................... 380/46
See application file for complete search history.

(56) References Cited

U.S. PATENT DOCUMENTS

| | | | | |
|---|---|---|---|---|
| 6,609,085 B1 * | 8/2003 | Uemura | ............... | G05B 19/418 |
| | | | | 702/189 |
| 8,683,215 B2 * | 3/2014 | Buer | ................. | H04L 9/3242 |
| | | | | 713/187 |
| 8,751,900 B2 * | 6/2014 | Kim | .................. | G06F 11/106 |
| | | | | 714/763 |
| 9,921,978 B1 * | 3/2018 | Chan | ................ | G06F 21/78 |
| 10,313,128 B2 * | 6/2019 | Hars | .................. | H04L 9/002 |
| 2007/0112903 A1 * | 5/2007 | Huang | ............. | G06F 7/5525 |
| | | | | 708/605 |
| 2010/0303231 A1 * | 12/2010 | Gorissen | .......... | H04L 9/0891 |
| | | | | 380/210 |
| 2011/0153910 A1 * | 6/2011 | MacKenna | ...... | G06F 13/4234 |
| | | | | 711/103 |
| 2016/0306750 A1 * | 10/2016 | Tucker | ............ | H04L 9/0869 |
| 2018/0123808 A1 * | 5/2018 | Hung | ................ | H04L 9/3278 |
| 2019/0095269 A1 * | 3/2019 | Howe | ............... | H01L 27/10811 |

(Continued)

OTHER PUBLICATIONS

Wikipedia, "Binary entropy function", pp. 1-2, Oct. 9, 2018 downloaded from https://en.wikipedia.org/w/index.php?title=Binary_entropy_function&oldid=863251986.

(Continued)

*Primary Examiner* — Tae K Kim
*Assistant Examiner* — Peiliang Pan
(74) *Attorney, Agent, or Firm* — Kligler & Associates Patent Attorneys Ltd

(57) ABSTRACT

A method is provided for generating a new instance of an N-bit cryptographic key for storage in a non-volatile memory (NVM) in which unprogrammed cells have a particular binary value. The method includes generating a random N-bit updating sequence, and generating the new instance of the N-bit cryptographic key by negating each bit in a current instance of the N-bit cryptographic key that has the particular binary value and differs from a correspondingly-positioned bit in the random N-bit updating sequence, without negating any bits in the current instance of the N-bit cryptographic key that do not have the particular binary value. Other embodiments are also described.

23 Claims, 4 Drawing Sheets

(56) References Cited

U.S. PATENT DOCUMENTS

2019/0163902 A1* 5/2019 Reid .................... G06F 9/3851
2020/0050383 A1* 2/2020 Shen .................... G06F 3/0634

OTHER PUBLICATIONS

Korean Patent Application # 1020190014578 Office Action dated Jun. 29, 2020.

* cited by examiner

UPDATING CRYPTOGRAPHIC KEYS STORED IN NON-VOLATILE MEMORY

FIELD OF THE INVENTION

The present invention relates to the field of cybersecurity, and especially to cryptographic keys used for encrypting communication.

BACKGROUND

The entropy $H(N,p)=H(N,1-p)$ of an N-bit cryptographic key, where p is the probability of any one of the bits in the key being 0 or 1, quantifies the randomness of the key. A key with a higher entropy is more secure than a key with a lower entropy. For keys having bits that are random, independent, and identically distributed (iid), $H(N,p)=NH(p)$ bits, where $H(p)=-(p\log_2 p+(1-p)\log_2(1-p))$. For example, for unbiased iid bits (for which p=0.5), H(p) attains its maximum value of one, such that $H(N,p)=N$.

A non-volatile memory (NVM) contains a plurality of single-bit memory cells, each of which may be in a programmed state or an unprogrammed state. Typically, by convention, an unprogrammed cell has the binary value 1, while a programmed cell has the binary value 0. In one-time programmable NVM (OTP NVM), a programming operation cannot be undone, i.e., a cell that is programmed cannot be subsequently deprogrammed (or "erased").

SUMMARY OF THE INVENTION

There is provided, in accordance with some embodiments of the present invention, an apparatus for generating a new instance of an N-bit cryptographic key for storage in a non-volatile memory (NVM), belonging to a device, in which unprogrammed cells have a particular binary value. The apparatus includes a network interface and a processor. The processor is configured to generate a random N-bit updating sequence. The processor is further configured to generate the new instance of the N-bit cryptographic key by negating each bit in a current instance of the N-bit cryptographic key that has the particular binary value and differs from a correspondingly-positioned bit in the random N-bit updating sequence, without negating any bits in the current instance of the N-bit cryptographic key that do not have the particular binary value. The processor is further configured to, subsequently to generating the new instance of the N-bit cryptographic key, using the network interface, communicate the new instance of the N-bit cryptographic key to the device for storage in the NVM.

In some embodiments, the particular binary value is 1, and the processor is configured to negate each bit in the current instance of the N-bit cryptographic key that has the particular binary value and differs from the correspondingly-positioned bit in the random N-bit updating sequence by performing a bitwise AND operation between the current instance of the N-bit cryptographic key and the random N-bit updating sequence.

In some embodiments, the particular binary value is 0, and the processor is configured to negate each bit in the current instance of the N-bit cryptographic key that has the particular binary value and differs from the correspondingly-positioned bit in the random N-bit updating sequence by performing a bitwise OR operation between the current instance of the N-bit cryptographic key and the random N-bit updating sequence.

In some embodiments, the processor is configured to generate each bit in the random N-bit updating sequence with a probability of having the particular binary value that is greater than 0.5.

In some embodiments,
the probability is equal to $n/2^m$ for a predetermined integer m and a variable integer n, and
the processor is configured to generate the random N-bit updating sequence by:
expanding an unbiased random seed, which has E bits, to N m-bit sequences that correspond to the bits of the random N-bit updating sequence, respectively, and
for each bit in the random N-bit updating sequence, setting the bit to the particular binary value in response to a value of the corresponding m-bit sequence being less than n.

In some embodiments, the processor is further configured to, subsequently to communicating the new instance of the N-bit cryptographic key to the device, use the new instance of the N-bit cryptographic key for encrypting and decrypting communication with the device.

In some embodiments, the processor is further configured to, prior to communicating the new instance of the N-bit cryptographic key to the device, encrypt the new instance of the N-bit cryptographic key using the current instance of the N-bit cryptographic key.

There is further provided, in accordance with some embodiments of the present invention, an apparatus that includes a non-volatile memory (NVM), including a plurality of single-bit cells, configured to store an N-bit cryptographic key, unprogrammed ones of the cells having a particular binary value, and a processor. The processor is configured to generate a random N-bit updating sequence. The processor is further configured to generate a new instance of the N-bit cryptographic key by negating each bit in a current instance of the N-bit cryptographic key that has the particular binary value and differs from a correspondingly-positioned bit in the random N-bit updating sequence, without negating any bits in the current instance of the N-bit cryptographic key that do not have the particular binary value. The processor is further configured to, subsequently to generating the new instance of the N-bit cryptographic key, replace the current instance of the N-bit cryptographic key with the new instance of the N-bit cryptographic key in the NVM.

In some embodiments,
the processor is configured to generate each bit in the random N-bit updating sequence with a particular probability of having the particular binary value, and
the processor is further configured to calculate the particular probability, prior to generating the random N-bit updating sequence, such that an expected entropy of the new instance of the key with respect to the current instance of the key is not less than a predefined threshold E that is less than N.

In some embodiments, the particular probability is greater than 0.5.

There is further provided, in accordance with some embodiments of the present invention, a method for generating a new instance of an N-bit cryptographic key for storage in a non-volatile memory (NVM) in which unprogrammed cells have a particular binary value. The method includes generating a random N-bit updating sequence, and generating the new instance of the N-bit cryptographic key by negating each bit in a current instance of the N-bit cryptographic key that has the particular binary value and differs from a correspondingly-positioned bit in the random N-bit updating sequence, without negating any bits in the current instance of the N-bit cryptographic key that do not have the particular binary value.

In some embodiments, generating the random N-bit updating sequence includes generating each bit in the random N-bit updating sequence with a probability of having the particular binary value that is greater than 0.5.

In some embodiments, the method further includes, prior to generating the random N-bit updating sequence:

identifying a number N1 of bits in the current instance of the N-bit cryptographic key that have the particular binary value;

solving $-(q\log_2 q+(1-q)\log_2(1-q))=E/N1$ for q, E being a predefined entropy threshold; and deriving the probability from q.

In some embodiments, deriving the probability from q includes deriving the probability from q by setting the probability to q.

In some embodiments, deriving the probability from q includes deriving the probability from q by setting the probability to a highest value $n/2^m$ that is not greater than q, m being a predetermined integer and n being a variable integer.

In some embodiments, the method further includes, prior to generating the random N-bit updating sequence:

identifying a number N1 of bits in the current instance of the N-bit cryptographic key having the particular binary value; and setting the probability to a maximum one of multiple predefined values of q for which $-(q\log_2 q+(1-q)\log_2(1-q))$ is not less than E/N1, E being a predefined entropy threshold.

There is further provided, in accordance with some embodiments of the present invention, a method for facilitating multiple updates of an N-bit cryptographic key in a non-volatile memory (NVM) in which unprogrammed cells have a particular binary value. The method includes calculating different respective probabilities $\{q_i\}$ i=1 ... U, for the updates such that, for each $i^{th}$ one of the updates, an expected entropy of a new instance of the N-bit cryptographic key with respect to a current instance of the N-bit cryptographic key is not less than a predefined threshold E that is less than N, provided that (i) the new instance of the N-bit cryptographic key is generated by negating each bit in the current instance of the N-bit cryptographic key that has the particular binary value and differs from a correspondingly-positioned bit in an N-bit random updating sequence, without negating any bits in the current instance of the N-bit cryptographic key that do not have the particular binary value, and (ii) each bit in the N-bit random updating sequence is generated with probability $q_i$ of having the particular binary value. The method further includes, subsequently to calculating the probabilities, providing the probabilities for use in performing the updates.

In some embodiments, each of the probabilities is greater than 0.5.

In some embodiments, calculating the probabilities includes, for each $i^{th}$ one of the updates: solving $-(q\log_2 q+(1-q)\log_2(1-q))=E/(N\Pi_0^{i-1}q_j)$ for q, $q_0$ being 1; and deriving $q_i$ from q.

In some embodiments, deriving $q_i$ from q includes deriving $q_i$ from q by setting $q_i$ to q.

In some embodiments, deriving $q_i$ from q includes deriving $q_i$ from q by setting $q_i$ to a highest value $n/2^m$ that is not greater than q, m being a predetermined integer and n being a variable integer.

In some embodiments, calculating the probabilities includes, for each $i^{th}$ one of the updates, setting $q_i$ to a maximum one of multiple predefined values of q for which $-(q\log_2 q+(1-q)\log_2(1-q))$ is not less than $E/(N\Pi_0^{i-1}q_j)$, $q_0$ being 1.

The present invention will be more fully understood from the following detailed description of embodiments thereof, taken together with the drawings, in which:

DETAILED DESCRIPTION OF EMBODIMENTS

Introduction

Figure 1:
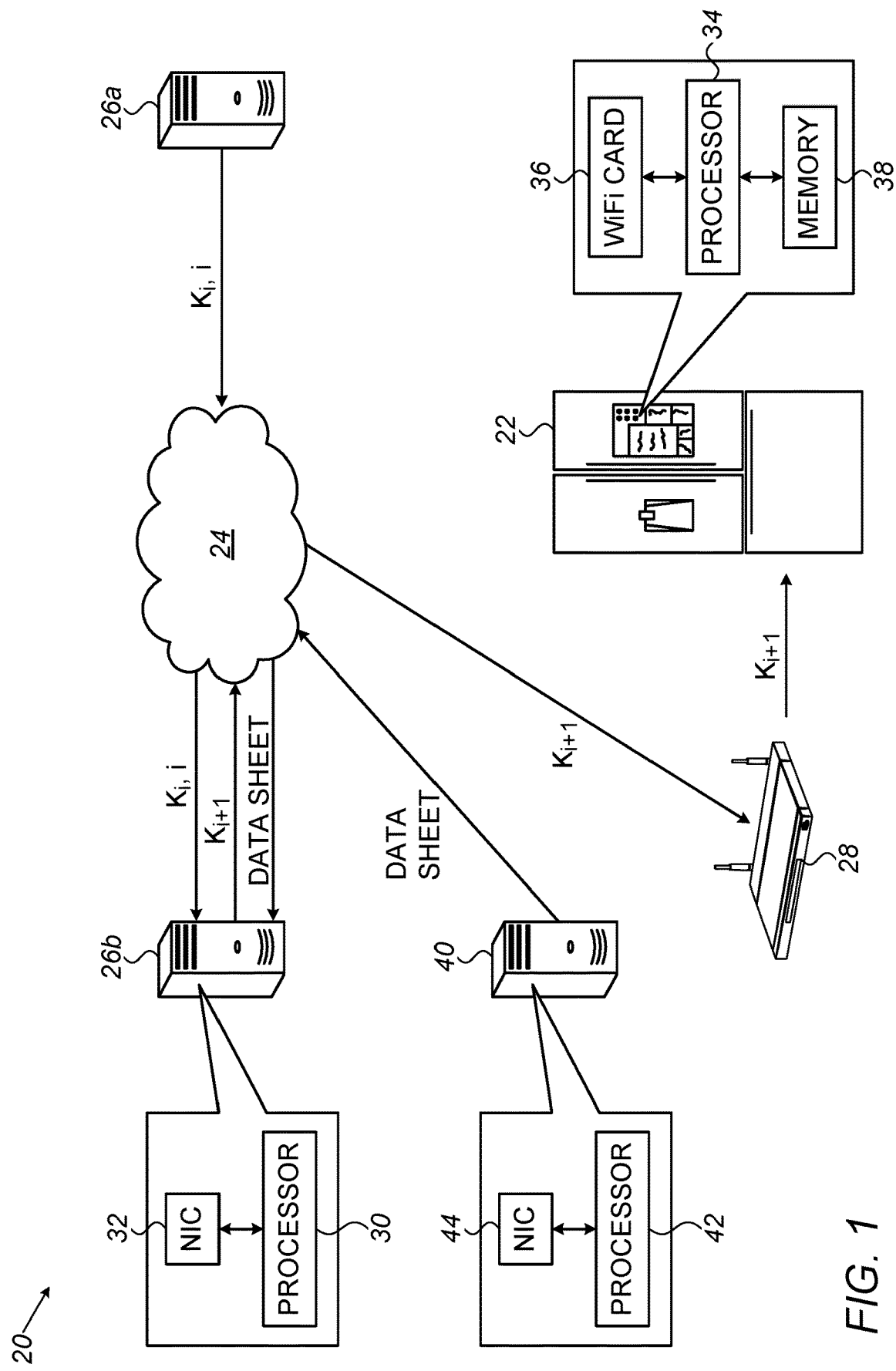
FIG. 1 is a schematic illustration of a system for updating a cryptographic key, in accordance with some embodiments of the present invention.

In the context of the present application, including the claims, the "updating" of a cryptographic key may refer to (i) the calculation of a new instance of the key, (ii) the replacement of the current instance of the key with the new instance of the key in a memory, or (iii) both (i) and (ii).

The present description generally assumes that, in an NVM, unprogrammed cells have the binary value 1, while programmed cells have the binary value 0. As explicitly noted below with reference to FIG. 2, however, the techniques described herein may also be utilized with NVMs that use the reverse convention.

Overview

Updating a cryptographic key stored in a non-volatile memory may be challenging. For example, as described above in the Background, OTP NVM does not allow erasure. Moreover, even for other types of non-volatile memory that allow erasure, an update operation may be insecure, in that an attacker may terminate the operation after the erasure of the current value of the key and prior to the writing of the new value of the key, thus "freezing" the key in its known unprogrammed state.

To address this challenge, embodiments of the present invention update the key by changing only (unprogrammed) 1 bits in the key, without changing any (programmed) 0 bits. In particular, given the current N-bit instance $K_i$ of the key (hereinafter denoted as "$K_i$"), an N-bit random sequence of bits $S_i$ (hereinafter denoted as "$S_i$") is generated, and the new instance $K_{i+1}$ of the key (hereinafter denoted as "$K_{i+1}$") is then computed by performing a bitwise AND operation between $K_i$ and $S_i$, or any equivalent operation. To ensure that the new instance of the key has sufficient entropy with respect to the current instance (i.e., to ensure that an attacker with knowledge of $K_i$ would have sufficient difficulty guessing $K_{i+1}$), the length N of the key is made longer than would be required if both 0 bits and 1 bits were to be updated.

(It is noted that, using an alternate descriptive convention, $K_i$ and $K_{i+1}$ may be referred to as different keys, rather than as different instances or values of the same key. Thus, for example, it may be said that $K_{i+1}$ is a new key that replaces $K_i$.)

Typically, to allow as many updates as possible, $S_i$ is generated biasedly, in that the probability $q_i$ (hereinafter denoted as "$q_i$") for each bit in $S_i$ being equal to 1 is greater than 0.5. (In some cases, for the final update of the key, $q_i$ may be exactly 0.5.) In particular, the maximum $q_i$ value that gives the required entropy is calculated numerically, and this maximum value is then used to generate $S_i$.

In some embodiments, each $q_i$ value is calculated immediately prior to the $i^{th}$ update, taking into account the current key $K_i$. By way of introduction, it is noted that the entropy of $K_{i+1}$, given $K_i$, is equal to $N1_i*H(q_i)$, where $N1_i$ is the number of 1 bits in $K_i$, and $H(q_i)=-(q_i \log_2 q_i+(1-q_i)\log_2(1-q_i))$. For this entropy to be greater than or equal to a particular threshold E (hereinafter denoted as "E"), $H(q_i)$ must be greater than or equal to $E/N1_i$. Hence, prior to the $i^{th}$ update, the quantity $E/N1_i$ may be computed. Subsequently, provided that $E/N1_i$ is less than or equal to one (the maximum possible value of H(q)), the equation $H(q)=E/N1_i$ may be solved numerically for q. (It is noted that the precision with which this solution is calculated may depend on the numerical method that is used, and on the manner in which the method is implemented.) The solution $q_i*$ to this equation—or the closest suitable value that is less than $q_i*$—may then be used as the value of $q_i$.

In other embodiments, a set of $q_i$ values $\{q_1, q_2, \ldots q_U\}$, for use in performing U updates of the key, is calculated in advance, prior to performing any updates. For this calculation, the expected value of $N1_i$, $N\Pi_0^{i-1}q_j$ (where $q_0$ is 1), is used to estimate the entropy of $K_{i+1}$ given $K_i$, such that, to attain the required entropy E, $H(q_i)$ must be greater than or equal to $E/N\Pi_0^{i-1}q_j$. (This quantity may be more succinctly written as $\lambda/\Pi_0^{i-1}q_j$, where $\lambda=E/N$.) The $q_i$ values may thus be solved iteratively, beginning with $q_1$, until it is ascertained (for i=U+1) that $E/(N\Pi_0^{i-1}q_j)$ is greater than one.

Typically, to facilitate generating $S_i$, $q_i$ is of the form $n/2^m$ for a predetermined integer m and a variable integer n. To generate $S_i$, an unbiased random seed $X_i$ (hereinafter denoted as "$X_i$"), comprising E bits, is generated or obtained. $X_i$ is then expanded—e.g., using a hash function—to N m-bit sequences corresponding, respectively, to the N bits of $S_i$. Subsequently, the value of each m-bit sequence is compared to n. If the value is less than n, the corresponding bit in $S_i$ is set to 1; otherwise, the bit is set to 0.

System Description

Reference is initially made to FIG. 1, which is a schematic illustration of a system 20 for updating a cryptographic key, in accordance with some embodiments of the present invention. In the particular embodiment illustrated in FIG. 1, an N-bit cryptographic key "K" is used for encrypting communication between an Internet of Things (IoT) device 22 and an Internet service provider (ISP) over Internet 24.

In general, provided that device 22 remains with the same ISP, and that the security of the key is not compromised, there is no need to update the key. However, in the event that device 22 switches to a different ISP, or if the security of the key is compromised, it may be necessary to update the key.

For example, FIG. 1 depicts a scenario in which device 22 has been serviced by a first ISP 26a, but will henceforth be serviced by a second ISP 26b. In this scenario, second ISP 26b requests the current instance of the key, $K_i$, from first ISP 26a. In response to this request, first ISP 26a communicates $K_i$, over Internet 24, to second ISP 26b. First ISP 26a may further communicate the value of i to second ISP 26b, i.e., first ISP 26a may specify the number of updates to the cryptographic key that have already been performed. Subsequently, second ISP 26b generates a new instance $K_{i+1}$ of the key, and then communicates $K_{i+1}$, over Internet 24, to device 22, e.g., via a router 28 that services a WiFi network to which device 22 belongs. (Typically, second ISP 26b encrypts $K_{i+1}$, e.g., using $K_i$, prior to communicating $K_{i+1}$ to device 22.) Subsequently, device 22 and second ISP 26b may begin communicating with one another, using $K_{i+1}$ for encrypting and decrypting the communication.

Second ISP 26b comprises a processor 30 and a network interface 32, comprising, for example, a network interface controller (NIC). Processor 30 is configured to exchange communication with first ISP 26a and device 22 (along with other devices) via network interface 32. Processor 30 is further configured to update the cryptographic key used for encrypting communication with device 22. For example, as described above, processor 30 may update the key upon initiating communication with device 22. Alternatively or additionally, processor 30 may update the key in response to processor 30 (or an external cybersecurity system) identifying that the key may have been stolen by an attacker.

Similarly, device 22 comprises a processor 34 and a communication interface 36. Processor 34 is configured to exchange communication with second ISP 26b (along with other devices) via communication interface 36. For example, communication interface 36 may comprise a WiFi card, which processor 34 may use to exchange communication via router 28.

Device 22 further comprises a memory 38, in which processor 34 stores the cryptographic key. Thus, for example, memory 38 may initially hold $K_i$. Subsequently to receiving $K_{i+1}$ from second ISP 26b, processor 34 may overwrite $K_i$ with $K_{i+1}$.

Typically, memory 38 is non-volatile; for example, memory 38 may be an OTP NVM, a flash memory, or an electrically erasable programmable read-only memory (EEPROM). Advantageously, however, as further described below with reference to FIG. 2, the updating of the cryptographic key does not necessitate deprogramming any memory cells in memory 38.

In some embodiments, as further described below with reference to FIG. 5, second ISP 26b generates $K_{i+1}$ using a parameter (specifically, a bit-generating probability $q_i$) that is contained in a data sheet provided by a server 40. For example, using network interface 44, server 40 may publish the data sheet to a website. Immediately prior to generating $K_{i+1}$, second ISP 26b may retrieve the data sheet from the website and look up, in the data sheet, the parameter that is needed for generating $K_{i+1}$. Alternatively, at any time prior to the generation of $K_{i+1}$, server 40 may communicate the data sheet (e.g., over Internet 24) to second ISP 26b, and second ISP 26b may then store the data sheet in a volatile or non-volatile memory (not shown). Subsequently, immediately prior to generating $K_{i+1}$, second ISP 26b may retrieve the data sheet from the memory, and then look up the relevant parameter.

In other embodiments, processor 34 of device 22 generates $K_{i+1}$, and then communicates $K_{i+1}$ to second ISP 26b. In such embodiments, processor 34 may receive the aforementioned data sheet from server 40. As another alternative, server 40, or any other suitable third party, may generate $K_{i+1}$, and may then communicate $K_{i+1}$ to both device 22 and second ISP 26b.

Server 40 comprises a processor 42 and a network interface 44, comprising, for example, a NIC. Processor 42 is configured to exchange communication with second ISP 26b (and/or with device 22) via network interface 44.

It is emphasized that the components and configuration of system 20 are provided by way of example only. In general, each of the various techniques described herein may be practiced by any suitable processor belonging to any suitable system. For example, the techniques described herein may be used to update a cryptographic key stored in an embedded subscriber identification module (eSIM) or an embedded secure element (eSE) belonging to a mobile phone. For example, the service provider for the mobile phone may generate $K_{i+1}$ and communicate $K_{i+1}$ to the mobile phone, and the mobile phone may then store $K_{i+1}$ in a non-volatile memory belonging to the phone.

In general, each of the processors described herein may be embodied as a single processor, or as a cooperatively networked or clustered set of processors. In some embodiments, the functionality of at least one of the processors described herein is implemented solely in hardware, e.g., using one or more Application-Specific Integrated Circuits (ASICs) or Field-Programmable Gate Arrays (FPGAs). In other embodiments, the functionality of each of the processors described herein is implemented at least partly in software. For example, in some embodiments, each of the processors described herein is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Generating the New Instance of the Key

Figure 2:
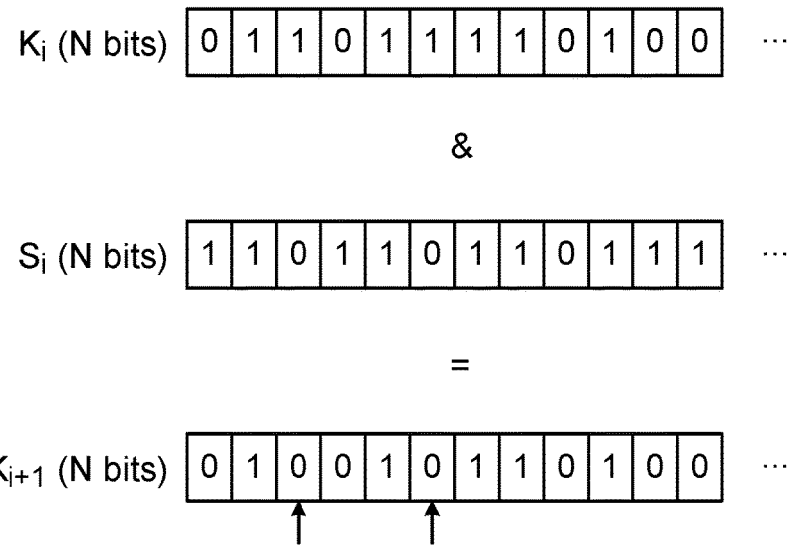
FIG. 2 is a schematic illustration of the generation of a new instance of a cryptographic key, in accordance with some embodiments of the present invention.

Reference is now made to FIG. 2, which is a schematic illustration of the generation of a new instance of a cryptographic key, in accordance with some embodiments of the present invention.

FIG. 2 relates to the scenario depicted in FIG. 1, whereby processor 30 (or, as described above, any other processor) generates a new instance $K_{i+1}$ of an N-bit cryptographic key, given the current instance $K_i$ of the key. As described above in the Overview and with reference to FIG. 1, $K_{i+1}$ is generated such that replacing $K_i$ with $K_{i+1}$ in an NVM does not necessitate deprogramming any memory cells. Nevertheless, as described in more detail below with reference to FIG. 4, the expected entropy of $K_{i+1}$ with respect to $K_i$ is not less than a predefined threshold entropy E. (The threshold E, which is less than the number of bits N in the cryptographic key, may be defined, for example, by a security architect for system 20.)

In particular, to generate $K_{i+1}$, the processor first generates a random N-bit updating sequence $S_i$. Next, the processor generates $K_{i+1}$ by negating each bit in $K_i$ that has the binary value 1 and differs from the correspondingly-positioned bit in $S_i$, without negating any bits in $K_i$ that do not have the binary value 1. FIG. 2 shows two such negated bits, marked by respective upward-pointing arrows.

Typically, as depicted in FIG. 2, the processor generates $K_{i+1}$ by performing a bitwise AND operation between $K_i$ and $S_i$. Hence, some 1 bits in $K_i$ are replaced by 0 bits in $K_{i+1}$, but no 0 bits in $K_i$ are replaced by 1 bits, such that the key may be updated in an NVM without the need to deprogram any cells.

The processor generates each bit in $S_i$ with a probability $q_i$ of being 1, $q_i$ typically being greater than 0.5. (As noted above in the Overview, in some cases, $q_i$ may be exactly 0.5 for the final update of the key.) In some embodiments, $q_i$ is specified in a data sheet, which is provided, as described above with reference to FIG. 1, by server 40. Such a data sheet may include, for example, a lookup table that specifies $q_i$ for various values of i, one or more values of N, and one or more values of E. In other embodiments, the processor calculates $q_i$. Further details regarding the calculation of $q_i$ are described below with reference to FIG. 4.

For the reverse NVM convention, in which unprogrammed memory cells have the binary value 0, the processor generates each bit in $S_i$ with a probability $q_i$ of being 0. The processor then negates each 0 bit in $K_i$ that differs from the correspondingly-positioned bit in $S_i$, e.g., by performing a bitwise OR operation between $K_i$ and $S_i$.

Generating the Random Sequence

Figure 3:
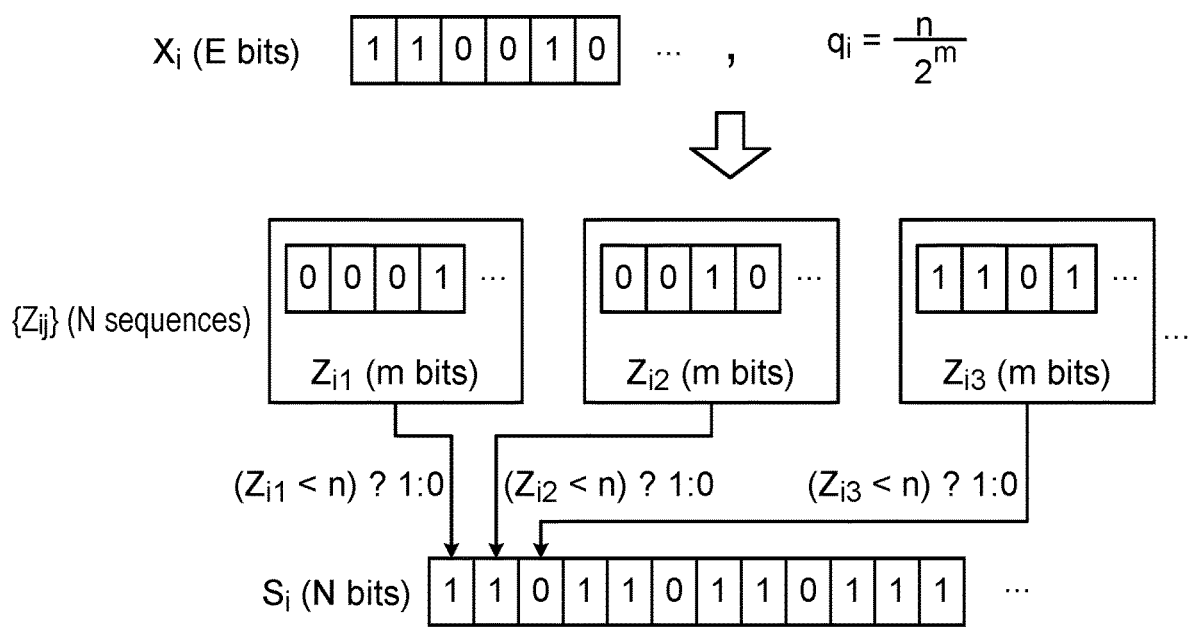
FIG. 3 is a schematic illustration of a technique for generating a random sequence, in accordance with some embodiments of the present invention.

Reference is now made to FIG. 3, which is a schematic illustration of a technique for generating the random sequence $S_i$, in accordance with some embodiments of the present invention. This technique assumes that $q_i$ is equal to $n/2^m$ for a predetermined integer m and a variable integer n. (For example, m may be 10, such that $q_i = n/1024$.)

To generate $S_i$, the processor first generates, or obtains from an external source, an unbiased random seed $X_i$ having E bits. ($X_i$ is unbiased in that each bit in $X_i$ has a probability of 0.5 of being 1.) The processor further looks up or calculates $q_i = n/2^m$. Subsequently, the processor expands $X_i$ to N m-bit sequences $\{Z_{ij}\}$, j=1 ... N, which correspond to the bits of $S_i$, respectively. For example, the processor may apply a hash function f(X, c) to $X_i$ with N different respective counters c, such that, for example, the first m-bit sequence $Z_{i1}$, corresponding to the first bit of $S_i$, is equal to $f(X_i, 1)$, the second m-bit sequence $Z_{i2}$, corresponding to the second bit of $S_i$, is equal to $f(X_i, 2)$, etc. Examples of suitable hash functions include the secure hash algorithm (SHA) functions, such as SHA-2, SHA-256, SHA-512, and SHA-3.

Next, for each bit in $S_i$, the processor sets the bit to 1 in response to the value of the corresponding m-bit sequence being less than n. For example, if $Z_{i1}$ is less than n, the first bit in $S_i$ is set to 1; otherwise, the bit is set to 0.

Notwithstanding the particular technique illustrated in FIG. 3, it is noted that $S_i$ may be generated using any other suitable technique (even if $q_i$ is not of the form $n/2^m$), provided that each bit in $S_i$ has a probability $q_i$ of being 1.

Calculating the Bit-Generating Probability for a Single Update

Figure 4:
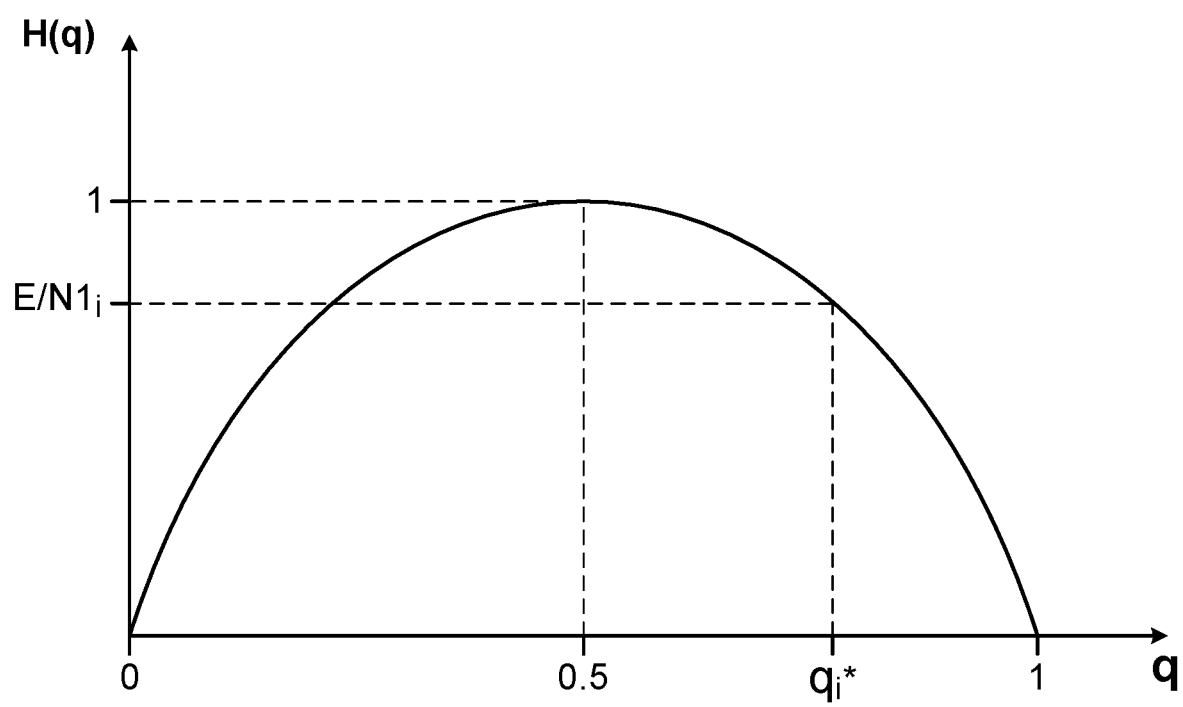
FIG. 4 is a schematic illustration of a technique for calculating a bit-generating probability, in accordance with some embodiments of the present invention.

Reference is now made to FIG. 4, which is a schematic illustration of a technique for calculating the bit-generating probability $q_i$, in accordance with some embodiments of the present invention.

In some embodiments, the processor that generates $K_{i+1}$ calculates $q_i$, prior to generating $S_i$. Typically, in such embodiments, the processor first identifies the number $N1_i$ of 1 bits in $K_i$. Next, as depicted in FIG. 4, the processor solves $H(q)=-(q\log_2 q+(1-q)\log_2(1-q))=E/N1_i$ for q, this solution being indicated in FIG. 4 by the notation $q_{i*}$. (In most cases, there are two solutions to the equation; the processor chooses the larger of the two solutions.) The processor then derives $q_i$ from $q_i^*$. For example, the processor may set $q_i$ to $q_{i*}$, or to the highest value $n/2^m$ that is less than or equal to $q_{i*}$. (In other words, the processor finds the highest integer n for which $n/2^m$ is less than or equal to $q_{i*}$.)

As described above in the Overview, the entropy of $K_{i+1}$, given $K_i$, is equal to $N1_i^*H(q_i)$. Hence, by setting $q_i$ to $q_i^*$, or to the nearest suitable value that is less than $q_{i*}$, the processor effectively chooses the largest suitable value of $q_i$ that provides an entropy of at least E.

Alternatively to solving for $q_{i*}$, the processor may define multiple values of q, and then set $q_i$ to the maximum one of these values for which $H(q)$ is not less than $E/N1_i$. For example, the processor may generate an array of values $[2^{m-1}/2^m, (2^{m-1}+1)/2^m, \ldots (2^m-1)/2^m]$, and then set $q_i$ to the maximum one of these values for which $H(q)$ is not less than $E/N1_i$.

In the event that $E/N1_i$ is greater than 1, the processor does not generate $K_{i+1}$, since the required entropy E cannot be attained. In this case, the processor may generate an appropriate error message indicating, for example, that memory 38 in device 22 (FIG. 1) needs to be replaced or erased.

Precalculating the Bit-Generating Probabilities for Multiple Updates

In some embodiments, the processor that generates $K_{i+1}$ does not use $N1_i$ to calculate $q_i$. Rather, the processor calculates, in advance, a sequence of $q_i$ values for multiple updates of the key, based on the expected value of $N1_i$, $N1_{i*}$, at each update. Alternatively, server 40 (FIG. 1) may generate a data sheet that specifies respective sequences of $q_i$ values for one or more pairs of N and E values. Subsequently, as described above with reference to FIG. 1, server 40 may provide the data sheet to any party (such as second ISP 26b) that wishes to update a cryptographic key in the manner described above with reference to FIGS. 2-3.

Figure 5:
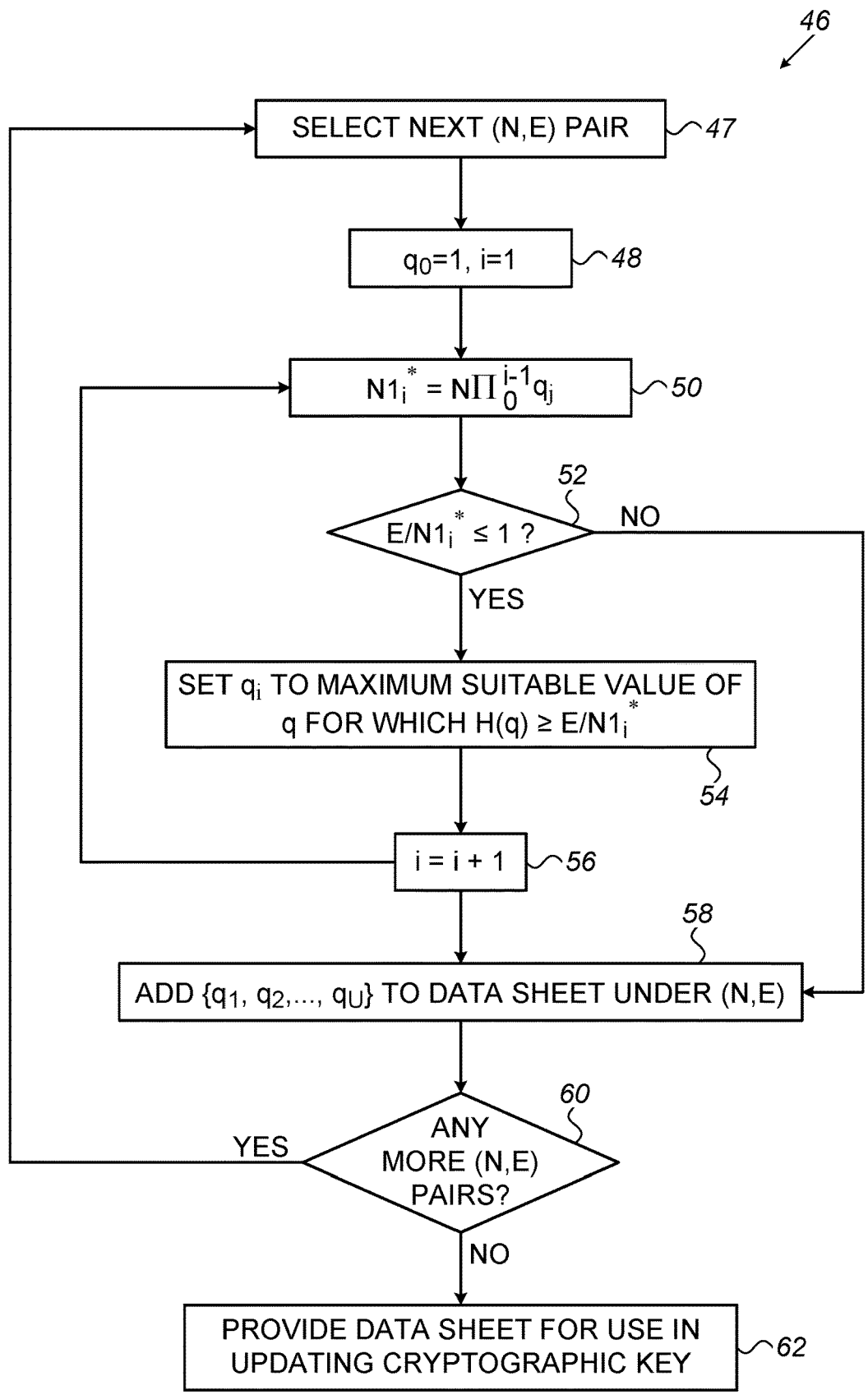
FIG. 5 is a flow diagram for a method for facilitating multiple updates of a cryptographic key, in accordance with some embodiments of the present invention.

In this regard, reference is now made to FIG. 5, which is a flow diagram for a method 46 for facilitating multiple updates of a cryptographic key, in accordance with some embodiments of the present invention. In particular, in method 46, a data sheet that specifies $\{q_i\}$ sequences for one or more different (N,E) pairs—i.e., one or more different pairs of values consisting of (i) N, the number of bits in the cryptographic key, and (ii) E, the entropy threshold—is generated and provided. Method 46 is typically performed by processor 42 of server 40, as described above. Alternatively, a subset of the steps in method 46—for example, the calculation of $\{q_i\}$ for a single (N,E) pair—may be performed by the processor, such as processor 30 of second ISP 26b, that updates the key.

Method 46 begins with a selecting step 47, at which processor 42 selects the next predefined (N,E) pair for which the sequence of bit-generating probabilities is to be calculated. (Each (N,E) pair may be provided to processor 42, for example, by a security expert.) Next, the processor calculates different respective probabilities $\{q_i\}$, $i=1 \ldots U$, for U updates of the key. Each $q_i$ value is calculated such that the expected entropy of the new instance of the key ($K_{i+1}$) with respect to the current instance of the key ($K_i$) is not less than E, provided that the new instance of the key is generated as described above with reference to FIGS. 2-3. In other words, $q_i$ is generally calculated as described above with reference to FIG. 4, with the expected entropy of $K_{i+1}$ with respect to $K_i$ ($H(q)*N1_i^*$) being used in place of the actual entropy (which cannot be known in advance).

More specifically, following selecting step 47, the processor, at an initializing step 48, sets $q_0$ to 1 and initializes the index i to 1. Subsequently, the processor iteratively calculates $q_i$ and increments the index, until the expected entropy of the new instance of the key becomes less than E. To calculate $q_i$, the processor first calculates $N1_i^*=N\Pi_0^{i-1}q_j$ at a calculating step 50. Next, at a first checking step 52, the processor checks whether $E/N1_{i*}$ is less than or equal to one. If yes, the processor, at a setting step 54, sets $q_i$ to the maximum suitable value of q for which $H(q)$ is not less than $E/N1_i^*$. For example, as described above with reference to FIG. 4, the processor may set $q_i$ to $q_i^*$ (where $H(q_i)=E/N1_i$), or to the nearest suitable value lower than $q_i^*$. Subsequently, at an incrementing step 56, the processor increments the index i.

Upon ascertaining, at first checking step 52, that $E/N1_{i*}$ is greater than one, the processor does not calculate $q_i$ for the current index i. Rather, the sequence $\{q_1, q_2, \ldots q_U\}$ that has been calculated thus far, where U (which is one less than the current index) is the maximum number of allowable updates to the key, is added to the data sheet under (N,E), at a data-sheet-updating step 58.

Following data-sheet-updating step 58, the processor checks, at a second checking step 60, whether any more (N,E) pairs remain. If yes, the processor returns to selecting step 47, calculates $\{q_i\}$ for the selected (N,E) pair, and then updates the data sheet. Otherwise, the processor, at a providing step 62, provides the completed data sheet for use in updating a cryptographic key. For example, as described above with reference to FIG. 1, the processor may upload the data sheet to a website, or communicate the data sheet to another device.

As described above with reference to FIG. 2, each $q_i$ value is typically greater than 0.5 (although, in some cases, $q_U$ may be exactly 0.5.) As can be seen by observing the graph of $H(q)$ shown in FIG. 4, the values of $q_{i*}$ (and hence, of $q_i$) decrease as i increases, given that $E/N1_{i*}$ increases with i. For example, for E=80 and N=256, method 46 returns a decreasing sequence of 11 $q_{i*}$values: 0.943, 0.938, 0.933, 0.926, 0.918, 0.907, 0.893, 0.872, 0.841, 0.785, and 0.623. (Implied in the above is that a 256-bit key may be updated 11 times using the technique described herein, provided that the required entropy is no more than 80 bits.)

Given the data sheet, the processor that generates the new instance of the key, such as processor 30 of second ISP 26b, looks up the appropriate $q_i$ value, given N, E, and i. (As described above with reference to FIG. 1, first ISP 26a may specify i to second ISP 26b.) Subsequently, as described above with reference to FIGS. 2-3, the processor uses $q_i$ to generate the updating sequence $S_i$, and then uses $S_i$ to generate $K_{i+1}$ from $K_i$.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
a network interface; and
a processor, configured to facilitate updating an N-bit cryptographic key stored in a non-volatile memory (NVM), belonging to a device, in which unprogrammed cells have a particular binary value, by:
generating a random N-bit updating sequence in which each bit is generated with a probability of having the particular binary value that is greater than 0.5,
generating a new instance of the N-bit cryptographic key by performing an operation that, for any value of a current instance of the N-bit cryptographic key and any value of the random N-bit updating sequence, negates each bit in the current instance of the N-bit cryptographic key that has the particular binary value and differs from a correspondingly-positioned bit in the random N-bit updating sequence but does not negate any bits in the current instance of the N-bit cryptographic key that do not have the particular binary value, and
subsequently to generating the new instance of the N-bit cryptographic key, using the network interface, communicating the new instance of the N-bit cryptographic key to the device for replacement of the current instance of the N-bit cryptographic key in the NVM.

2. The apparatus according to claim 1, wherein the particular binary value is 1, and wherein the operation includes a bitwise AND operation between the current instance of the N-bit cryptographic key and the random N-bit updating sequence.

3. The apparatus according to claim 1, wherein the particular binary value is 0, and wherein the operation includes a bitwise OR operation between the current instance of the N-bit cryptographic key and the random N-bit updating sequence.

4. The apparatus according to claim 1,
wherein the probability is equal to $n/2^m$ for a predetermined integer m and a variable integer n, and
wherein the processor is configured to generate the random N-bit updating sequence by:
expanding an unbiased random seed, which has E bits, to N m-bit sequences that correspond to the bits of the random N-bit updating sequence, respectively, and
for each bit in the random N-bit updating sequence, setting the bit to the particular binary value in response to a value of the corresponding m-bit sequence being less than n.

5. The apparatus according to claim 1, wherein the processor is further configured to, subsequently to communicating the new instance of the N-bit cryptographic key to the device, use the new instance of the N-bit cryptographic key for encrypting and decrypting communication with the device.

6. The apparatus according to claim 1, wherein the processor is further configured to, prior to communicating the new instance of the N-bit cryptographic key to the device, encrypt the new instance of the N-bit cryptographic key using the current instance of the N-bit cryptographic key.

7. Apparatus, comprising:
a non-volatile memory (NVM), comprising a plurality of single-bit cells, configured to store an N-bit cryptographic key, unprogrammed ones of the cells having a particular binary value; and
a processor, configured to:
generate a random N-bit updating sequence in which each bit is generated with a probability of having the particular binary value that is greater than 0.5,
generate a new instance of the N-bit cryptographic key by performing an operation that, for any value of a current instance of the N-bit cryptographic key and any value of the random N-bit updating sequence, negates each bit in a current instance of the N-bit cryptographic key that has the particular binary value and differs from a correspondingly-positioned bit in the random N-bit updating sequence but does not negate any bits in the current instance of the N-bit cryptographic key that do not have the particular binary value, and
subsequently to generating the new instance of the N-bit cryptographic key, replace the current instance of the N-bit cryptographic key with the new instance of the N-bit cryptographic key in the NVM.

8. The apparatus according to claim 7,
wherein the processor is further configured to calculate the probability, prior to generating the random N-bit updating sequence, such that an expected entropy of the new instance of the key with respect to the current instance of the key is not less than a predefined threshold entropy E that is less than N.

9. A method for use with a non-volatile memory (NVM) in which unprogrammed cells have a particular binary value, the method comprising:
generating a random N-bit updating sequence in which each bit is generated with a probability of having the particular binary value that is greater than 0.5; and
generating a new instance of an N-bit cryptographic key for replacement of a current instance of the N-bit cryptographic key in the NVM, by performing an operation that, for any value of the current instance of the N-bit cryptographic key and any value of the random N-bit updating sequence, negates each bit in the current instance of the N-bit cryptographic key that has the particular binary value and differs from a correspondingly-positioned bit in the random N-bit updating sequence but does not negate any bits in the current instance of the N-bit cryptographic key that do not have the particular binary value.

10. The method according to claim 9, wherein the particular binary value is 1, and wherein the operation includes a bitwise AND operation between the current instance of the N-bit cryptographic key and the random N-bit updating sequence.

11. The method according to claim 9, wherein the particular binary value is 0, and wherein the operation includes a bitwise OR operation between the current instance of the N-bit cryptographic key and the random N-bit updating sequence.

12. The method according to claim 9, further comprising, prior to generating the random N-bit updating sequence:
identifying a number N1 of bits in the current instance of the N-bit cryptographic key that have the particular binary value;
solving $-(q\log_2 q + (1-q)\log_2(1-q)) = E/N1$ for q, E being a predefined entropy threshold; and
deriving the probability from q.

13. The method according to claim 12, wherein deriving the probability from q comprises deriving the probability from q by setting the probability to q.

14. The method according to claim 12, wherein deriving the probability from q comprises deriving the probability from q by setting the probability to a highest value $n/2^m$ that is not greater than q, m being a predetermined integer and n being a variable integer.

15. The method according to claim 9, further comprising, prior to generating the random N-bit updating sequence:
   identifying a number N1 of bits in the current instance of the N-bit cryptographic key having the particular binary value; and
   setting the probability to a maximum one of multiple predefined values of q for which $-(q\log_2 q+(1-q)\log_2(1-q))$ is not less than E/N1, E being a predefined entropy threshold.

16. The method according to claim 9,
   wherein the probability is equal to $n/2^m$ for a predetermined integer m and a variable integer n, and
   wherein generating the random N-bit updating sequence comprises:
      expanding an unbiased random seed, which has E bits, to N m-bit sequences that correspond to the bits of the random N-bit updating sequence, respectively, and
      for each bit in the random N-bit updating sequence, setting the bit to the particular binary value in response to a value of the corresponding m-bit sequence being less than n.

17. The method according to claim 9, wherein the NVM belongs to a device, and wherein the method further comprises:
   subsequently to generating the new instance of the N-bit cryptographic key, communicating the new instance of the N-bit cryptographic key to the device for storage in the NVM; and
   subsequently to communicating the new instance of the N-bit cryptographic key to the device, using the new instance of the N-bit cryptographic key for encrypting and decrypting communication with the device.

18. The method according to claim 9, further comprising replacing the current instance of the N-bit cryptographic key with the new instance of the N-bit cryptographic key in the NVM.

19. A method, comprising:
   calculating different respective probabilities $\{q_i\}$, i=1 . . . U, each of the probabilities being greater than 0.5, for multiple updates of an N-bit cryptographic key stored in a non-volatile memory (NVM) in which unprogrammed cells have a particular binary value such that, for each $i^{th}$ one of the updates, an expected entropy of a new instance of the N-bit cryptographic key with respect to a current instance of the N-bit cryptographic key is not less than a predefined threshold entropy E that is less than N, provided that:
      the new instance of the N-bit cryptographic key is generated by performing an operation that, for any value of the current instance of the N-bit cryptographic key and any value of a random N-bit updating sequence, negates each bit in the current instance of the N-bit cryptographic key that has the particular binary value and differs from a correspondingly-positioned bit in the N-bit random updating sequence but does not negate any bits in the current instance of the N-bit cryptographic key that do not have the particular binary value, and
      each bit in the N-bit random updating sequence is generated with probability $q_i$ of having the particular binary value; and
   subsequently to calculating the probabilities, providing the probabilities for use in performing the updates.

20. The method according to claim 19, wherein calculating the probabilities comprises, for each $i^{th}$ one of the updates:
   solving $-(q\log_2 q+(1-q)\log_2(1-q))=E/(N\Pi_0^{i-1} q_j)$ for q, $q_0$ being 1; and
   deriving $q_i$ from q.

21. The method according to claim 20, wherein deriving $q_i$ from q comprises deriving $q_i$ from q by setting $q_i$ to q.

22. The method according to claim 20, wherein deriving $q_i$ from q comprises deriving $q_i$ from q by setting $q_i$ to a highest value $n/2^m$ that is not greater than q, m being a predetermined integer and n being a variable integer.

23. The method according to claim 19, wherein calculating the probabilities comprises, for each $i^{th}$ one of the updates, setting $q_i$ to a maximum one of multiple predefined values of q for which $-(q\log_2 q+(1-q)\log_2(1-q))$ is not less than $E/(N\Pi_0^{i-1} q_j)$, $q_0$ being 1.

* * * * *